US008699347B2

(12) United States Patent
Amano

(10) Patent No.: US 8,699,347 B2
(45) Date of Patent: Apr. 15, 2014

(54) COMMUNICATION APPARATUS, COMMUNICATION SYSTEM, COMMUNICATION METHOD, AND A COMPUTER-READABLE MEDIUM

(75) Inventor: Katsuhiro Amano, Aichi-ken (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 253 days.

(21) Appl. No.: 13/172,407

(22) Filed: Jun. 29, 2011

(65) Prior Publication Data

US 2012/0002565 A1 Jan. 5, 2012

(30) Foreign Application Priority Data

Jun. 30, 2010 (JP) ................................ 2010-150583

(51) Int. Cl.
*H04L 12/28* (2006.01)
(52) U.S. Cl.
USPC ........................... 370/236; 370/289; 709/224
(58) Field of Classification Search
USPC ......... 370/229, 230, 232–234, 236, 252, 389; 709/224
See application file for complete search history.

(56) References Cited

U.S. PATENT DOCUMENTS

| 8,400,915 | B1 * | 3/2013 | Brown et al. | 370/230 |
| 2001/0046212 | A1 * | 11/2001 | Nakajima | 370/278 |
| 2003/0120816 | A1 * | 6/2003 | Berthaud et al. | 709/248 |
| 2004/0243703 | A1 * | 12/2004 | Demmer et al. | 709/224 |

FOREIGN PATENT DOCUMENTS

JP 4175353 8/2008

OTHER PUBLICATIONS

T. Tsugawa et al.; "Implementation and evaluation of an inline network measurement algorithm and its application technique"; Technical Report of the Institute of Electronics, Information and Communication Engineers, pp. 79-84; Dec. 2005.
C. Le Thanh Man et al.; "A study on Inline Network Measurement Mechanism for Service Overlay Networks"; Technical Report of the Institute of Electronics, Information and Communication Engineers, pp. 753-758, vol. 102, No. 565; Jan. 17, 2003.
C. Le Thanh Man et al.; Inline Bandwidth Measurement Techniques for Gigabit Networks, International Journal of Internet Protocol Technology (IJIPT); vol. 3, No. 2, pp. 81-94, 2008.

* cited by examiner

*Primary Examiner* — Paul H Masur
(74) *Attorney, Agent, or Firm* — Studebaker & Brackett PC

(57) ABSTRACT

A communication apparatus can perform reliable and stable communication with one or more counterpart apparatuses in a communication network, where the network has plural communication paths in which data communication transmissions are performed according to a predetermined transmission condition. The transmission condition of a communication packet for at least one of the plural communication paths is determined to be different from the predetermined transmission condition if bandwidth measurement is not performed on that communication path while bandwidth measurement is performed on one or more of the other communication paths. Accuracy of measuring available bandwidth in the communication network can be improved because communication paths that perform bandwidth measurements are less impacted by communication paths that do not perform bandwidth measurement.

20 Claims, 12 Drawing Sheets

Fig.4

| COMMUNICATION APPARATUS ID | TRANSMITTING / RECEIVING | COMMUNICATIONS STATE | | |
|---|---|---|---|---|
| | | CONNECTED | DURING DATA COMMUNICATION | DURING MEASUREMENT |
| 11 | TRANSMITTING PATH | 1 | 1 | 1 |
| | RECEIVING PATH | | 1 | 1 |
| 13 | TRANSMITTING PATH | 1 | 1 | 0 |
| | RECEIVING PATH | | 1 | 0 |
| 14 | TRANSMITTING PATH | 0 | 0 | 0 |
| | RECEIVING PATH | | 0 | 0 |

241

COMMUNICATION APPARATUS, COMMUNICATION SYSTEM, COMMUNICATION METHOD, AND A COMPUTER-READABLE MEDIUM

CROSS-REFERENCE TO RELATED APPLICATION

This application claims priority to Japanese Patent Application No. 2010-150583, filed Jun. 30, 2010, the disclosure of which is hereby incorporated herein by reference in its entirety.

BACKGROUND

The present disclosure relates to a communication apparatus, a communication system, a communication method, and a computer-readable medium storing a communication program, which can accurately measure an available bandwidth of a communication network.

Communication apparatuses have been known that can measure an available capacity of a transmission path in a communication network (such as the Internet) whose communication environment changes. Hereinafter, a "capacity of a transmission path" may be referred to as a "bandwidth," and an available capacity of a transmission path will be referred to as an "available bandwidth." For example, such communication apparatuses are configured so that only a communication apparatus that has received an accept notification packet can transmit a measurement packet for measuring the bandwidth. Thus, simultaneous transmission of measurement packets from a plurality of communication apparatuses can be avoided. Therefore, the communication apparatus can measure an available bandwidth of the communication network while preventing the communication apparatus and a relay apparatus through which the communication apparatus is connected to the communication network from being subjected to an excessive communication load.

SUMMARY

The present disclosure describes a communication apparatus, a communication system, a communication method, and a non-transitory computer-readable medium that stores a communication program, which can accurately measure an available bandwidth of a communication network.

According to a first aspect of the present disclosure, a communication apparatus is configured for performing data communication with at least one counterpart communication apparatus in accordance with a predetermined transmission condition, where each counterpart communication apparatus is connected to a communication network via plural communication paths and the bandwidth of at least one of the plural communication paths being measured. The communication apparatus is adapted to determine a transmission condition of a communication packet for at least one of the plural communication paths not having a bandwidth thereof measured while bandwidth is measured on the at least one of the plural communication paths, where the determined transmission condition is different from the predetermined transmission condition for transmission.

According to a second aspect of the present disclosure, a communication system includes a first communication apparatus connected to a communication network and a second communication apparatus connected to the communication network. The first communication apparatus and the second communication apparatus perform data communication with each other in accordance with a predetermined transmission condition. The first communication apparatus is adapted to identify a communication path on which a bandwidth measurement is not being performed, the communication path being one of plural communication paths between the first apparatus and the second apparatus, when the bandwidth measurement is performed on one or more of the plural communication paths. The first communication apparatus is adapted to receive a request packet from the second communication apparatus, where the request packet requesting a change in transmission condition for transmitting a communication packet for performing the data communication with the second communication apparatus. The first communication apparatus also is adapted to determine the transmission condition of the communication packet to be different from the predetermined transmission condition if the communication path between the first communication apparatus and the second communication apparatus that has transmitted the request packet is the same as the communication path identified by the first apparatus. The first communication apparatus is adapted to transmit the communication packet to the second communication apparatus in accordance with a determined transmission condition. The second communication apparatus is adapted to identify a communication path on which a bandwidth measurement is not being performed, where the communication path is one of the plural communication paths between the second communication apparatus and the first communication apparatus, when the bandwidth measurement is performed on one or more of the plural communication paths. The second communication apparatus is adapted to transmit the request packet to the first communication apparatus via the communication path that is identified by the second communication apparatus.

According to a third aspect of the present disclosure, a communication method, which is performed by a communication apparatus that performs data communication with at least one counterpart apparatus in accordance with a predetermined transmission condition, each counterpart apparatus being another communication apparatus connected to a communication network, the bandwidth of at least one of the plural communication paths being measured, includes the step of determining a transmission condition of a communication packet for transmission on at least one of the plural communications paths not having a bandwidth thereof measured while bandwidth is measured on the at least one of the plural communication paths to be different from the predetermined transmission condition.

According to a fourth aspect of the present disclosure, a non-transitory computer-readable medium storing a communication program that causes a communication apparatus to perform instructions of data communication with at least one counterpart apparatus in accordance with a predetermined transmission condition, where each counterpart apparatus being another communication apparatus connected to a communication network, and the bandwidth of at least one of the plural communication paths being measured, the program including instructions that cause a computer to perform the step of determining a transmission condition of a communication packet for transmission on at least one of the plural communications paths not having a bandwidth thereof measured while bandwidth is measured on the at least one of the plural communication paths to be different from the predetermined transmission condition.

BRIEF DESCRIPTION OF THE DRAWINGS

FIG. 4 is a diagram showing a management table according to an exemplary embodiment.

DETAILED DESCRIPTION OF THE EXEMPLARY EMBODIMENTS

Hereinafter, embodiments will be described with reference to the drawings. These drawings are used for describing technical features that are applicable to the present disclosure. The configurations of apparatuses and the flowcharts of processes described herein are examples, and the present disclosure is not limited thereto.

When a communication apparatus is measuring an available bandwidth of a specific communication path, control over other communications that are not related to the measurement of an available bandwidth is not performed. The inventors have recognized there is a problem in that such communications that are not related to the measurement of an available bandwidth can apply a communication load to the communication apparatus or the relay apparatus, and as a result, the communication apparatus may not accurately measure an available bandwidth. Embodiments described herein can address this problem and facilitate accurate measure of available bandwidth of a communication network.

Figure 1:
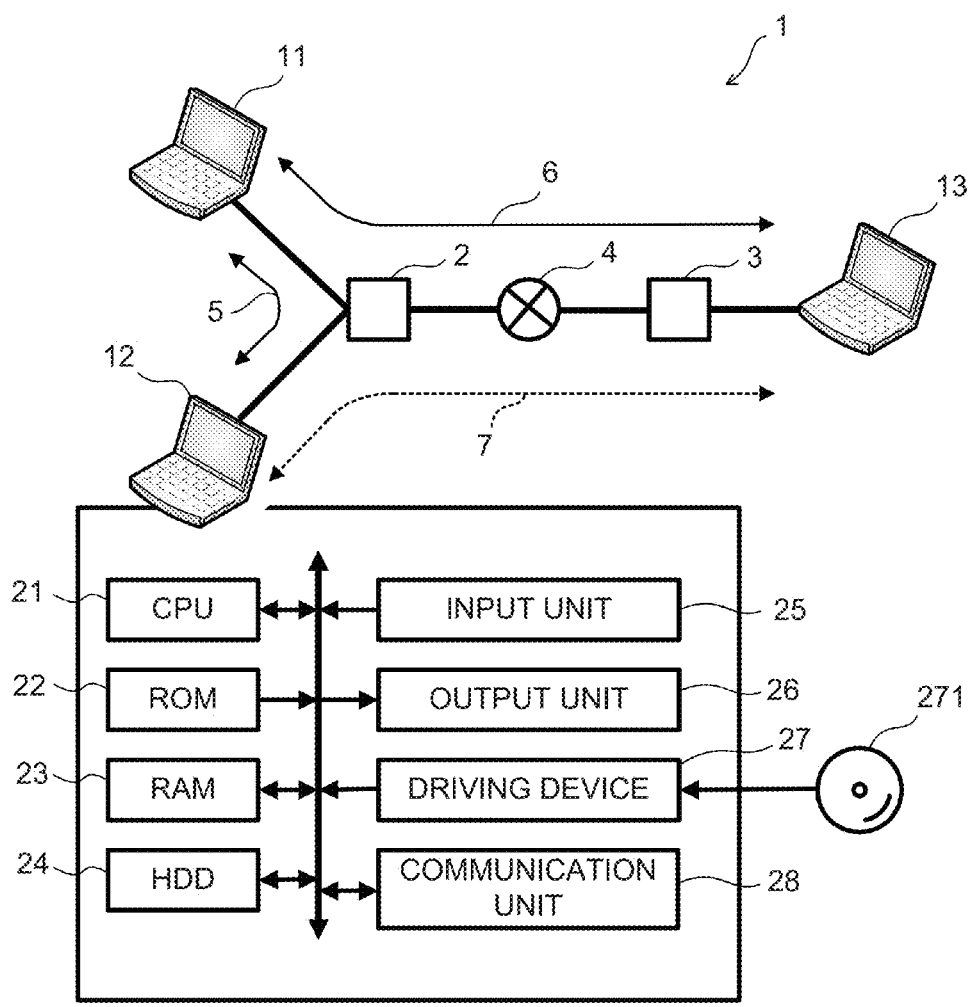
FIG. 1 is a diagram showing a communication system and an electrical configuration of a communication apparatus according to an exemplary embodiment.

Referring to FIG. 1, a communication system 1 in accordance with an exemplary embodiment will now be described. The communication system 1 includes communication apparatuses 11 to 13 and relay apparatuses 2 and 3. The communication apparatuses 11 to 13 can perform communication with each other via a network 4 and the relay apparatuses 2 and 3. For example, known PCs can be used as the communication apparatuses 11 to 13. The relay apparatuses 2 and 3 are directly connected to the network 4, and control transfer of packets that are transmitted and received among the communication apparatuses 11 to 13. When the relay apparatuses 2 and 3 receive packets from the communication apparatuses 11 to 13, the relay apparatuses 2 and 3 temporarily store data of the received packets in a receiving buffer 31 (see FIG. 2). The relay apparatuses 2 and 3 take out the packets, which are stored in the receiving buffer 31, as necessary, and transfer the packets to a counterpart communication apparatus. Known routers or switching HUBS can be used as the relay apparatuses 2 and 3. In FIG. 1, the communication apparatuses 11 and 12 are directly connected to the relay apparatus 2. The communication apparatus 13 is directly connected to the relay apparatus 3.

An exemplary electrical configuration of the communication apparatus 12 will now be described. The communication apparatuses 11 and 13 each can have the same or similar electrical configuration as that of the communication apparatus 12. The communication apparatus 12 includes a CPU 21 that controls the communication apparatus 12. The CPU 21 is electrically connected to a ROM 22, a RAM 23, a hard disk drive (HDD) 24, an input unit 25, an output unit 26, a driving device 27, and a communication unit 28. The ROM 22 stores a boot program, a BIOS, an OS, and the like. The RAM 23 stores a timer, a counter, and temporary data. The HDD 24 stores a program for controlling the CPU 21. The input unit 25 can include a keyboard and a mouse or other input device for receiving input from a user. The output unit 26 can be a display for displaying a desired image. The driving device 27 can read information that is stored in a storage medium 271. For example, when setting up the communication apparatus 12, a control program that is stored in the storage medium 271 is read by the driving device 27 and stored in the HDD 24. The communication unit 28 controls the timing at which the communication apparatus communicates with another communication apparatus via the network 4.

Each of the communication apparatuses 11 to 13 can measure an available transmission capacity of a communication path between the communication apparatus and another communication apparatus by transmitting packets to, and receiving packets from the other communication apparatus. Hereinafter, the transmission capacity may be referred to as the "bandwidth," and an available transmission capacity may be referred to as an "available bandwidth." The communication apparatuses 11 to 13 identify the optimum communication method (for error detection, error correction, retransmission control, and the like) in accordance with the measured available bandwidth. The communication apparatuses 11 to 13 can reliably perform communication with another communication apparatus on the basis of the identified communication method.

An available bandwidth of a communication path can be, for example, measured on the basis of a method described in Cao Le Thanh Man, Go Hasegawa, Masayuki Murata, "A study on Inline Network Measurement Mechanism for Service Overlay Networks", Technical report of IEICE (The Institute of Electronics, Information and Communication Engineers), Jan. 17, 2003, Vol. 102, No. 565, pp. 53-58. This method will now be described briefly. A communication apparatus that transmits a packet will be referred to as a "transmitting apparatus," and a communication apparatus that receives the packet will be referred to as a "receiving apparatus." The transmitting apparatus stores time information, which is used for calculating a transmission interval at which packets are transmitted, in the packet. The size of the packet is adjusted to a predetermined size. The transmitting apparatus continuously transmits a plurality of packets while changing a transmission bandwidth by gradually changing the transmission interval. The receiving apparatus stores a receiving interval at which the packets are received. Subsequently, the difference between the transmission interval that is stored in the time information of the packets and the receiving interval stored in the receiving apparatus is calculated. An available bandwidth can be identified from the trend of change in the calculated differences. The transmitting apparatus is notified of the identified available bandwidth. Thus, the transmitting apparatus can acquire the available bandwidth. A method of measuring an available bandwidth used in the present invention is not limited to the above-described method.

The communication apparatuses 11 to 13 can use a packet that is transmitted to or received from another communication apparatus to perform desired data communication as a packet for measuring an available bandwidth. A packet that is transmitted or received for data communication will be referred to as a "communication packet." Measurement of an available bandwidth will be referred to as "bandwidth measurement." For example, the transmitting apparatus sets the size of data of a communication packet at a predetermined size. Time information is stored in the communication packet. The transmitting apparatus continuously transmits communication packets while gradually changing the transmission interval. The receiving apparatus can acquire desired data by receiving the communication packets. The receiving apparatus can identify an available bandwidth of a communication path between the receiving apparatus and the transmitting apparatus by using the time information stored in the received communication packets. The transmitting apparatus is notified of the identified available bandwidth. Thus, the communication apparatus can perform desired data communication, and at the same time, acquire an available bandwidth of the communication path. For individual data communication, a user can choose whether or not to perform bandwidth measurement simultaneously with the data communication.

When bandwidth measurement is not performed simultaneously with data communication, the size and the transmission interval of the communication packets can be determined in accordance with the total size of data that is transmitted to a counterpart communication apparatus, an application for controlling the communication, and the setting of a communication driver. Therefore, if, for example, the amount of transmitted data is very large, the packets can have a large size. Moreover, if the data to be transmitted is randomly generated, the transmission interval of the packets changes randomly, so that short transmission cycles can successively occur.

For example, in FIG. 1, data communication (arrow 5) between the communication apparatus 11 and the communication apparatus 12, and data communication (arrow 6) between the communication apparatus 11 and the communication apparatus 13 are performed simultaneously with bandwidth measurement. Therefore, the size and the transmission interval of communication packets that are transmitted and received during the communications can be controlled so as to enable bandwidth measurement. On the other hand, data communication (arrow 7) between the communication apparatus 12 and the communication apparatus 13 is not performed simultaneously with bandwidth measurement. Therefore, depending on the communication status, a communication packet having a large size can be transmitted or short transmission cycles can successively occur.

Figure 2:
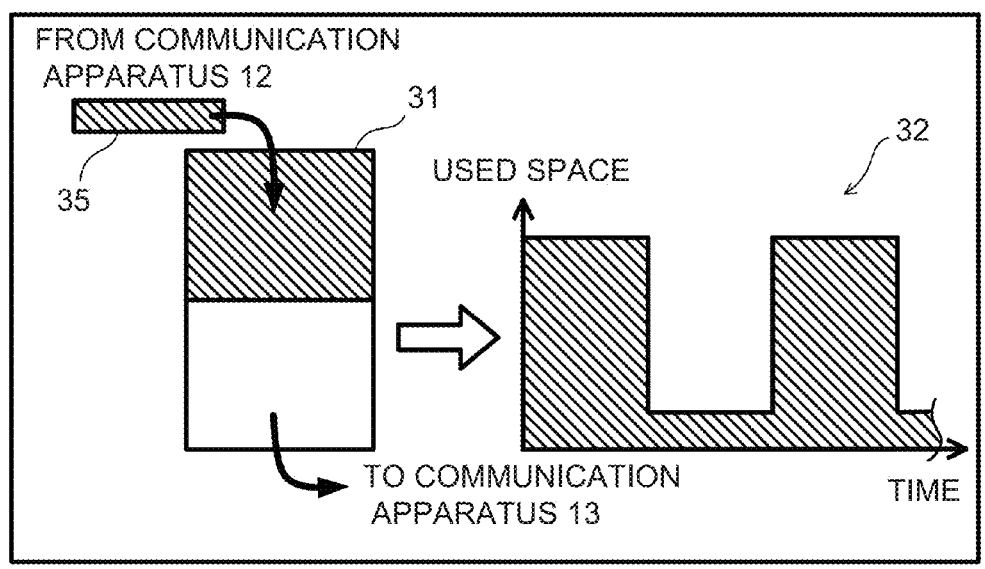
FIG. 2 is a schematic diagram showing an example of how data is stored in a receiving buffer of a relay apparatus.

Referring to FIG. 2, how data of a communication packet 35, which has been transmitted from the communication apparatus 12, is stored in the receiving buffer 31 of the relay apparatus 2 (see FIG. 1) and transferred to the communication apparatus 13 will now be described. The receiving buffer 31 stores the data using a first-in first-out (FIFO) method, for example. The data of the communication packet 35, which is received by the relay apparatus 2, is stored at a location corresponding to the highest address of the receiving buffer 31. As time elapses, the communication packet 35 moves to a location corresponding to a lower address, and finally communication packet 35 is taken out from a location corresponding to the lowest address of the receiving buffer 31, and transferred to the communication apparatus 13 via the network 4 (see FIG. 1).

It is assumed that the communication packet 35 that is transmitted from the communication apparatus 12 has a large size. As illustrated in FIG. 2, when the data of the communication packet 35 is stored in the receiving buffer 31 of the relay apparatus 2, most of the space of the receiving buffer 31 becomes occupied by the data, so that the amount of free space becomes insufficient. As illustrated in a graph 32 in FIG. 2, which represents a change in the amount of free space in the receiving buffer 31 over time, when communication packets having large sizes are repeatedly received, variation in the used space in the receiving buffer 31 becomes large, and the amount of free space in the receiving buffer 31 becomes unstable. When the amount of free space in the receiving buffer 31 is insufficient, the relay apparatus 2 cannot receive a new communication packet, so that the relay apparatus 2 cannot stably transfer communication packets.

Moreover, when the amount of free space in the receiving buffer 31 is insufficient, the relay apparatus 2 cannot stably transfer not only the communication packets for data communication between the communication apparatus 12 and the communication apparatus 13, but also the communication packets for data communication between the communication apparatus 11 and the communication apparatus 13, and the communication packets for data communication between the communication apparatus 11 and the communication apparatus 12. Because bandwidth measurement is performed between the communication apparatus 11 and the communication apparatus 13, and between the communication apparatus 11 and the communication apparatus 12 simultaneously with data communication, if the relay apparatus 2 cannot stably transfer the communication packets, accuracy of bandwidth measurement is reduced. In particular, because all communication packets that are transmitted and received among the communication apparatuses 11 to 13 pass through the relay apparatus 2, if the relay apparatus 2 cannot stably transfer the communication packets, the bandwidth measurement suffers from a significant negative effect.

As in the case where communication packets having large sizes are transmitted (see FIG. 2), if short transmission cycles of the communication packets transmitted from the communication apparatus 12 successively occur (not illustrated), most of the space of the receiving buffer 31 can be occupied and the amount of free space can become insufficient. If the amount of free space in the receiving buffer 31 is insufficient, accuracy of the measurement of an available bandwidth, which is performed between the communication apparatus 11 and the communication apparatus 13, and between the communication apparatus 11 and the communication apparatus 12, is reduced.

In contrast, in the present exemplary embodiment, the transmission condition for a communication packet that is not related to the bandwidth measurement (for example, data communication indicated by the arrow 7 in FIG. 1) is determined to be one of the following conditions.

(1) The size of a communication packet is small.

(2) The size of a communication packet is randomly set.

(3) The transmission cycle of communication packets is uniform.

(4) The transmission cycle of communication packets is randomly set.

(5) The size and the transmission cycle of communication packets are determined so that the transmission speed becomes constant.

Figure 3:
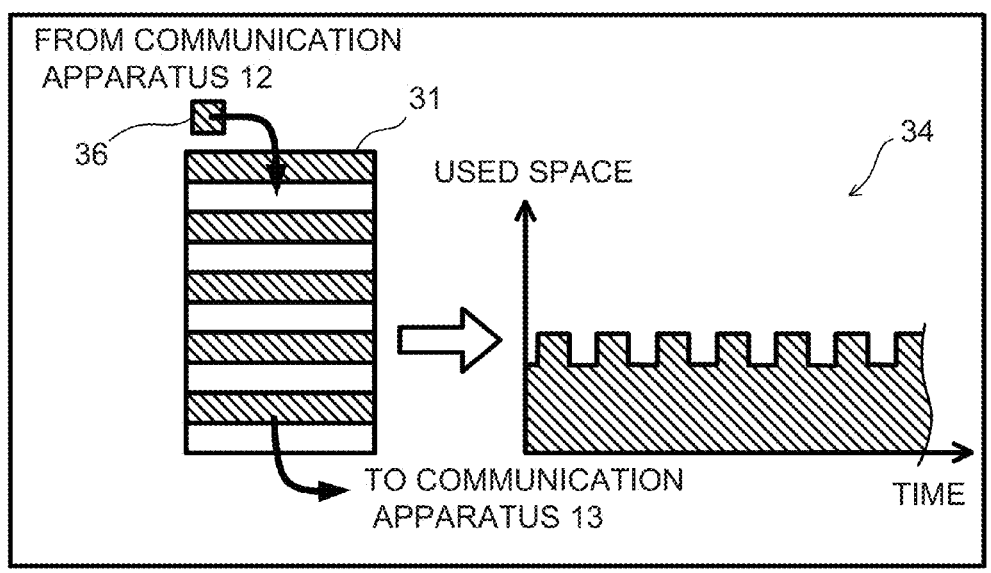
FIG. 3 is a schematic diagram showing another example of how data is stored in the receiving buffer of the relay apparatus.

If the transmission condition for a communication packet is (1), as illustrated in FIG. 3, the size of a communication packet 36 transmitted from the communication apparatus 12 is small. Therefore, when the data of the communication packet 36 is stored in the receiving buffer 31 of the relay apparatus 2, most of the space of the receiving buffer 31 is not simultaneously occupied and the amount of free space does not become insufficient. As illustrated in a graph 34 in FIG. 3, which represents a change in the amount of free space in the receiving buffer 31 over time, when the communication packets 36 having small sizes are repeatedly received, variation in the amount of used space in the receiving buffer 31 is small, and the amount of free space in the receiving buffer 31 remains stable. Therefore, the relay apparatus 2 can stably receive and transfer the communication packets. As a result, data communication between the communication apparatus 11 and the communication apparatus 13 and data communication between the communication apparatus 11 and the communication apparatus 12 can be smoothly performed, and an available bandwidth is accurately measured by bandwidth measurement that is performed simultaneously with the data communication.

The size of a communication packet can be, for example, set at 64 bytes at the minimum according to the Ethernet (registered trademark) standards. However, the size of a communication packet may be set at the optimum value that is calculated using the total capacity of the receiving buffer 31 of the relay apparatus 2, the transmission interval of communication packets, the number of communication paths that pass through the relay apparatus 2, and the like. For example, if the total capacity of the receiving buffer 31 is large, the size of a communication packet can be larger than 64 bytes. If the number of communication paths that pass through the relay apparatus 2 is small, the size of a communication packet may be larger than 64 bytes.

For example, the size of a communication packet may be set in the following way. First, the distribution of the sizes of communication packets is measured when the sizes of the communication packets are not controlled. Either the distribution of the sizes of communication packets that are transmitted and received between the communication apparatuses 11 and 13 or the distribution of the sizes of all communication packets that pass through the network 4 can be measured. The size corresponding to the peak of the distribution is temporarily identified as the size of all communication packets. For example, if the identified size of the communication packets exceeds 128 bytes, the size of the communication packets can be adjusted to 128 bytes.

When the size of a communication packet is small, communication packets need to be divided and reconstructed by the communication apparatus. As a result, the processing load of the communication apparatus is increased. However, when the size of a communication packet is determined by using the method described above, for example, if a communication packet has a size that is smaller than the peak size, the communication packet is transmitted without adjusting the size. Thus, division and reconstruction of the communication packet is not always necessary, so that the processing load of the communication apparatus can be reduced. The size of the communication packet is adjusted to 128 bytes at the maximum, so that the variation in the amount of free space in the receiving buffer 31 can be suppressed.

If the transmission condition is (2), data items for communication packets having large sizes are not continuously stored in the receiving buffer 31, so that it does not happen that most space of the receiving buffer 31 is occupied for a long time. That is, the amount of free space in the receiving buffer 31 does not become insufficient for a long time, so that data communication between the communication apparatus 11 and the communication apparatus 13 and data communication between the communication apparatus 11 and the communication apparatus 12 are smoothly performed. Therefore, an available bandwidth can be accurately measured by bandwidth measurement that is performed simultaneously with data communication. Moreover, the data amount during data communication can be made larger than that in the case where the transmission condition is (1).

The size of a communication packet can be determined on the basis of a known randomized algorithm. For example, the size of a communication packet is determined so that the sizes of communication packets in a predetermined range have an equal probability. The size of a communication packet can be determined at a packet size that is allowed according to the Ethernet (registered trademark) standards (in the range of 64 to 1518 bytes). Alternatively, the size of a communication packet can be determined so that the sizes of communication packets that are transmitted within a predetermined time are averaged out.

If the transmission condition is (3), it does not happen that a large number of data items for communication packets are stored in the receiving buffer 31 in a short time, so that there is always a certain amount of free space in the receiving buffer 31. Thus, data communication between the communication apparatus 11 and the communication apparatus 13, and data communication between the communication apparatus 11 and the communication apparatus 12, are smoothly performed. Hence, accuracy of bandwidth measurement that is performed simultaneously with the data communication can be improved.

The transmission cycle of the communication packets can be adjusted so that there is always a certain amount of free space in the receiving buffer 31. The transmission cycle of the communication packets can be determined in accordance with the total amount of data during data communication. For example, the transmission cycle may be adjusted to 20 ms.

If the transmission condition is (4), data items for communication packets are not continuously stored in the receiving buffer 31 in a short cycle. Accordingly, most space of the receiving buffer 31 is not occupied for a long time. Because the amount of free space in the receiving buffer 31 does not become continuously insufficient for a long time, data communication can be smoothly performed between the communication apparatus 11 and the communication apparatus 13, and between the communication apparatus 11 and the communication apparatus 12. Therefore, accuracy of bandwidth measurement that is performed simultaneously with the data communications can be improved. In contrast to the case where the transmission condition is (3), even when the data amount changes during data communication, a trouble due to the change is avoided by adjusting the transmission cycle. The transmission cycle of the communication packet can be determined on the basis of a known randomized algorithm.

If the transmission condition is (5), the data amount of communication packets that are received by the relay apparatus 2 within a certain time is uniform, so that the variation in the amount of used space in the receiving buffer 31 is small and the amount of used space in the receiving buffer 31 is stabilized. Therefore, data communication can be smoothly performed between the communication apparatus 11 and the communication apparatus 13, and between the communication apparatus 11 and the communication apparatus 12, so that accuracy of bandwidth measurement that is performed simultaneously with the data communications can be further improved.

The transmission speed is determined by "the size of communication packet×transmission interval." Therefore, in order to make the transmission speed constant, the size and the transmission interval of communication packet are adjusted. For example, the size of the communication packet may be determined in accordance with the data amount during data communication, and then the transmission interval may be determined so that the transmission speed becomes constant.

As heretofore described, with the communication apparatuses 11 to 13, a load on the receiving buffer 31 of the relay apparatus 2 and 3 can be reduced by adjusting the transmission condition of the communication packet. Thus, data communication that is not performed simultaneously with a bandwidth measurement is prevented from impeding a bandwidth measurement. Therefore, the communication apparatuses 11 to 13 can accurately measure an available bandwidth by performing a bandwidth measurement.

Referring to FIG. 4, a management table 241, which is an example of a management table stored in the HDD 24, will be described. The management table 241 is used to manage the connection state and the communication state of communication with another communication apparatus. The management table 241 stores the ID of another communication apparatus in the communication system 1, and the communication state of a communication path connected to the communication apparatus. In FIG. 4, the communication state includes "connected," "during data communication," and "during measurement." Flags corresponding to "connected," "during data communication," and "during measurement" are associated with the IDs of the communication apparatuses and are stored. Flags for "during data communication" and "during measurement" are stored for each of a communication path through which data is transmitted from the communication apparatus itself to another communication apparatus (transmitting path) and a communication path through which data is received from the other communication apparatus to the communication apparatus (receiving path).

If the flag for "connected" is "1," the communication apparatus is connected to a counterpart communication apparatus (and data communication can be performed). If the flag for "connected" is "0," the communication apparatus is not connected to a counterpart communication apparatus. If the flag for "during data communication" is "1," data communication between the communication apparatus and a counterpart communication apparatus is being performed. If the flag for "during data communication" is "0," data communication between the communication apparatus and a counterpart communication apparatus is not being performed. If the flag for "during measurement" is "1," bandwidth measurement is performed simultaneously with data communication between the communication apparatus and a counterpart communication apparatus. If the flag for "during measurement" is "0," bandwidth measurement is not performed simultaneously with data communication between the communication apparatus and a counterpart communication apparatus.

For example, in the state illustrated in the management table 241, the communication apparatus 11 is ready to perform data communication (connected: 1), data communication is being performed on both of the transmitting path and the receiving path (during data communication: 1), and bandwidth measurement is being performed on both of the transmitting path and the receiving path (during measurement: 1).

Referring to FIGS. 5 to 8, exemplary processes performed by the CPU 21 of the communication apparatus 12 will now be described. The processes are performed by the CPU 21 when the CPU 21 is powered on. An operating system switches the processes as necessary. Thus, the processes are independently and parallely performed.

Figure 5:
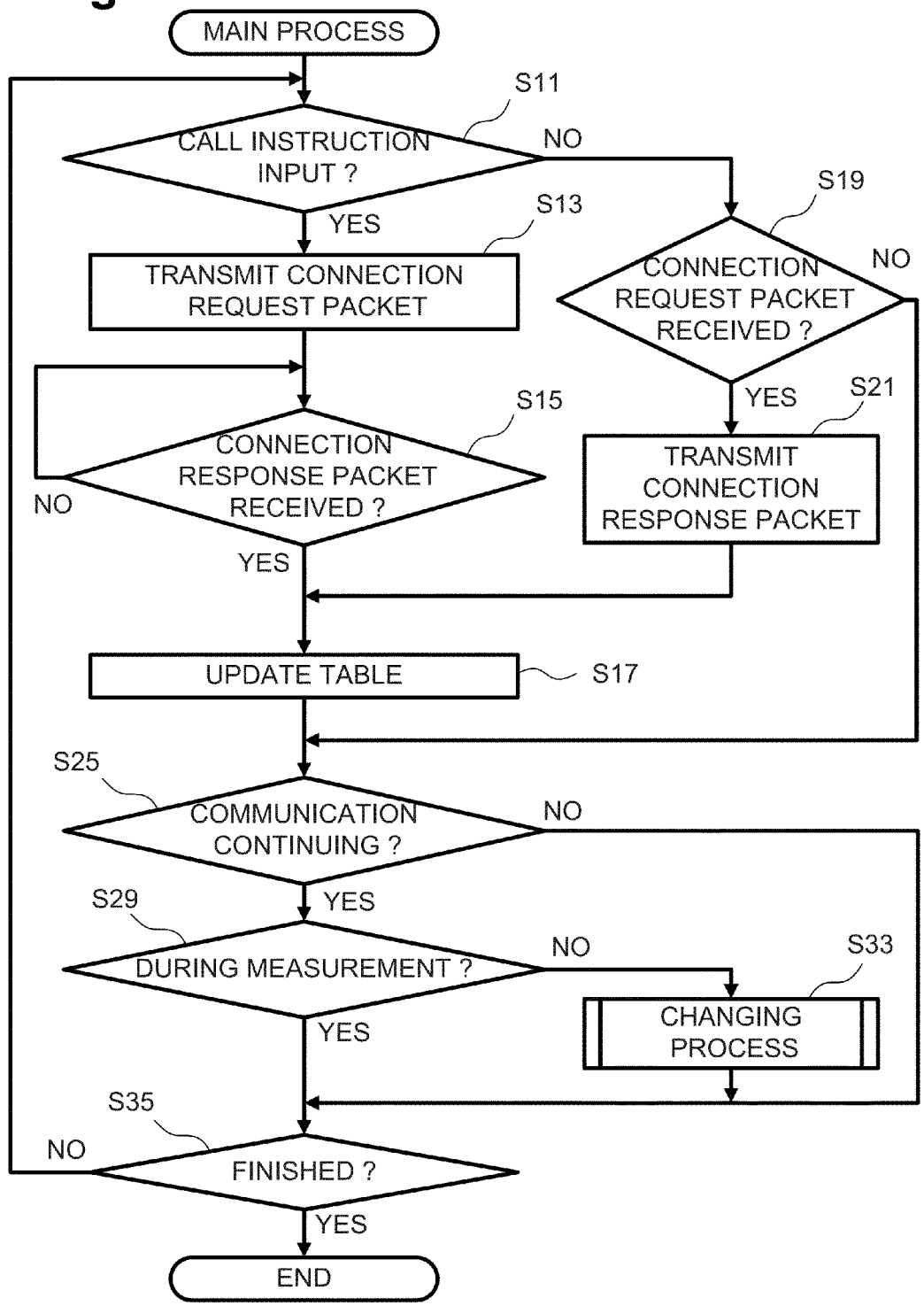
FIG. 5 is a flowchart showing a main process according to an exemplary embodiment.

Referring to FIG. 5, the main process will now be described. Whether or not a user has input an instruction to start data communication with another communication apparatus and to initiate a call to another communication apparatus is determined (step S11). If an instruction to initiate a call has been input (i.e., "YES" in step S11), a connection request packet, which requests a counterpart communication apparatus to be connected with the communication apparatus itself, is transmitted to the counterpart communication apparatus of data communication (step S13). After the connection request packet has been transmitted, whether or not a connection response packet is received from the counterpart communication apparatus that has received the connection request packet is determined (step S15). If a connection response packet has not been received (i.e., "NO" in step S15), the process returns to step S15. If a connection response packet has been received (i.e., "YES" in step S15), data communication with the counterpart communication apparatus is ready to be performed, and the management table 241 (see FIG. 4) is updated (step S17). The ID of the counterpart communication apparatus is stored. As the initial values for a communication state, "connected: 1", "during data communication (transmitting/receiving): 1", and "during measurement (transmitting/receiving): 1" are stored. The management table 241 is periodically updated by an update process described below. The process proceeds to step S25.

If a user has not input an instruction to initiate a call to another communication apparatus (i.e., "NO" in step S11), whether or not a connection request packet transmitted from another communication apparatus has been received is determined (step S19). If the connection request packet has been received (i.e., "YES" in step S19), a connection response packet is transmitted to the other communication apparatus that has transmitted the connection request packet (step S21). Because data communication with the other communication apparatus that has transmitted the connection request packet is ready, the management table 241 (see FIG. 4) is updated (step S17). The ID of the communication apparatus that has transmitted a connection request packet is stored. As the initial values of the communication state, "connected: 1", "during data communication (transmitting/receiving): 1", and "during measurement (transmitting/receiving): 1" are stored. The process proceeds to step S25. Hereinafter, a communication apparatus having an ID that is stored in the management table 241 will be referred to as a "counterpart apparatus." If an instruction to initiate a call to another communication apparatus has not been input (i.e., "NO" in step S11) and a connection request packet has not been received from another communication apparatus (i.e., "NO" in step S19), the process proceeds to step S25.

Whether or not data communication from the communication apparatus itself to the counterpart apparatus is continuously performed is determined (step S25). The direction from the communication apparatus itself to the counterpart apparatus will be referred to as the "transmitting direction." In the management table 241, if the flags corresponding to "during data communication" and "transmitting path" are all "0," data communication on the transmitting direction is not continuously performed (i.e., "NO" in step S25), and the process proceeds to step S35.

If "1" is stored as the flag corresponding to "during data communication—transmitting path" in the management table 241, there is a counterpart apparatus that is continuously performing data communication in the transmitting direction (i.e., "YES" in step S25). Next, whether or not bandwidth measurement is not performed simultaneously with data communication in the transmitting direction and bandwidth measurement is performed simultaneously with data communication on one or more other communication paths is determined (step S29). If "1" is stored as the flag corresponding to "during measurement—transmitting path" in the management table 241, bandwidth measurement is performed simultaneously with data communication in the transmitting direction (i.e., "YES" in step S29). Even if "0" is stored as the flag corresponding to "during measurement—transmitting path" in the management table 241, if the flag "1" is not stored as the flag corresponding to "during measurement" on another communication path (i.e., "YES" in step S29), the process proceeds to S35.

In the management table 241, if "0" is stored as the flag corresponding to a communication state "during measurement—transmitting path" with a counterpart apparatus that is continuously performing data communication and "1" is stored as the flag for "during measurement" of one or more other communication paths, bandwidth measurement in the transmitting direction is not performed and bandwidth measurement is performed simultaneously with data communication on one or more other communication paths (i.e., "NO" in step S29). In this case, the process (changing process, see FIG. 6) of changing the transmission condition of a communication packet, which is transmitted during data communication in the transmitting direction, is performed (step S33).

Figure 6:
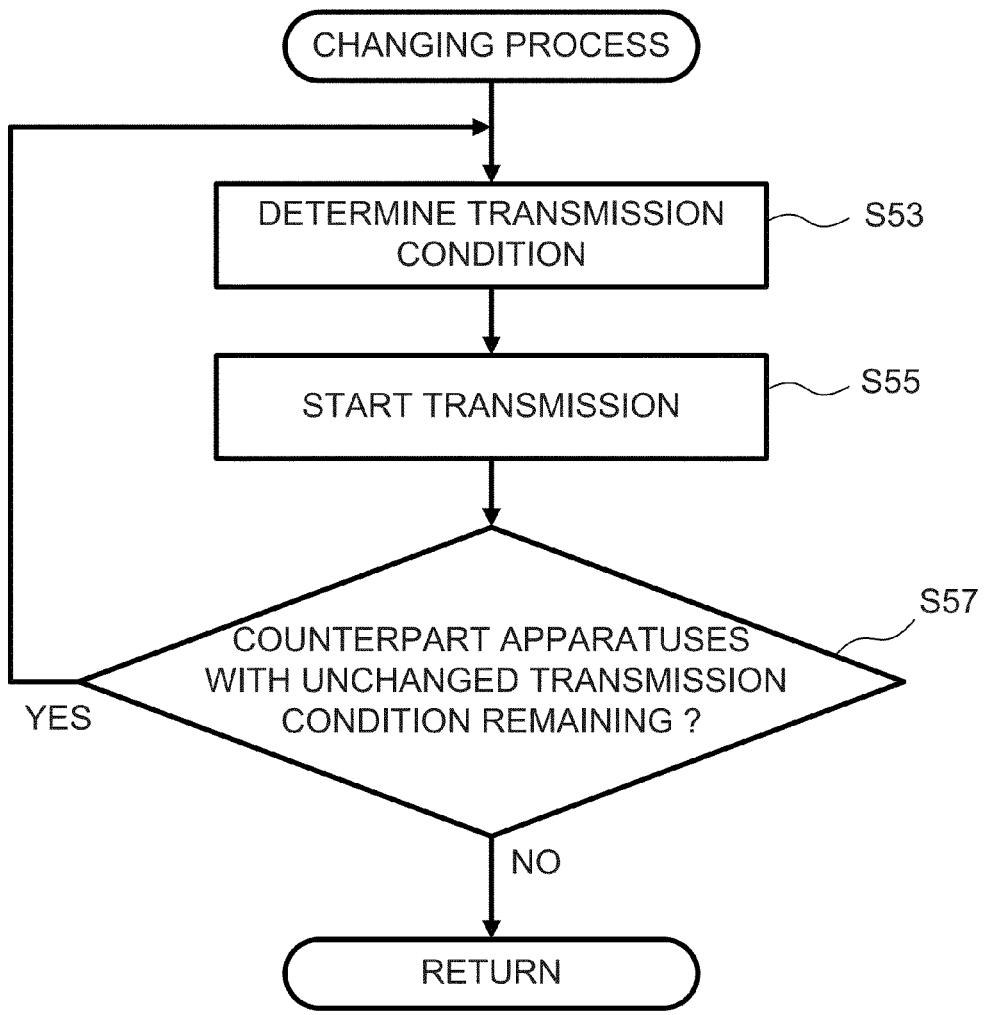
FIG. 6 is a flowchart showing a changing process according to an exemplary embodiment.

Referring to FIG. 6, the changing process will be described. First, one of the counterpart apparatuses of data communication that is being performed in the transmitting direction and that is not performed simultaneously with measurement communication is selected. The transmission condition for transmitting a communication packet to the selected counterpart apparatus is determined to be one of (1) to (5) (step S53). The transmission condition may be appropriately determined to be the optimum transmission condition among (1) to (5) in accordance with the total data amount during data communication. A communication packet is transmitted to the counterpart apparatus in accordance with the determined transmission condition (step S55). Thus, data communication in the transmitting direction is performed.

Whether or not there is a counterpart apparatus for which the transmission condition has not been changed among the counterpart apparatuses of data communication that is being performed in the transmitting direction and that is not performed simultaneously with measurement communication is determined (step S57). If there is a counterpart apparatus for which the transmission condition has not been changed (i.e., "YES" in step S57), the process returns to step S53. If the transmission conditions for all counterpart apparatuses have been changed (i.e., "NO" in step S57), the changing process is finished, and the process returns to the main process (see FIG. 5). In the main process, as illustrated in FIG. 5, the process proceeds to step S35 after the changing process (step S33) has been finished.

Whether or not all connections with counterpart apparatuses have ended is determined (step S35). If the flag corresponding to "connected" are all "0" in the management table 241, there are no counterpart apparatuses that are connected (i.e., "YES" in step S35), and the main process is finished. If "1" is stored as the flag corresponding to "connected" in the management table 241, there is a counterpart apparatus that is connected (i.e., "NO" in step S35), and the process returns to step S11.

Figure 7:
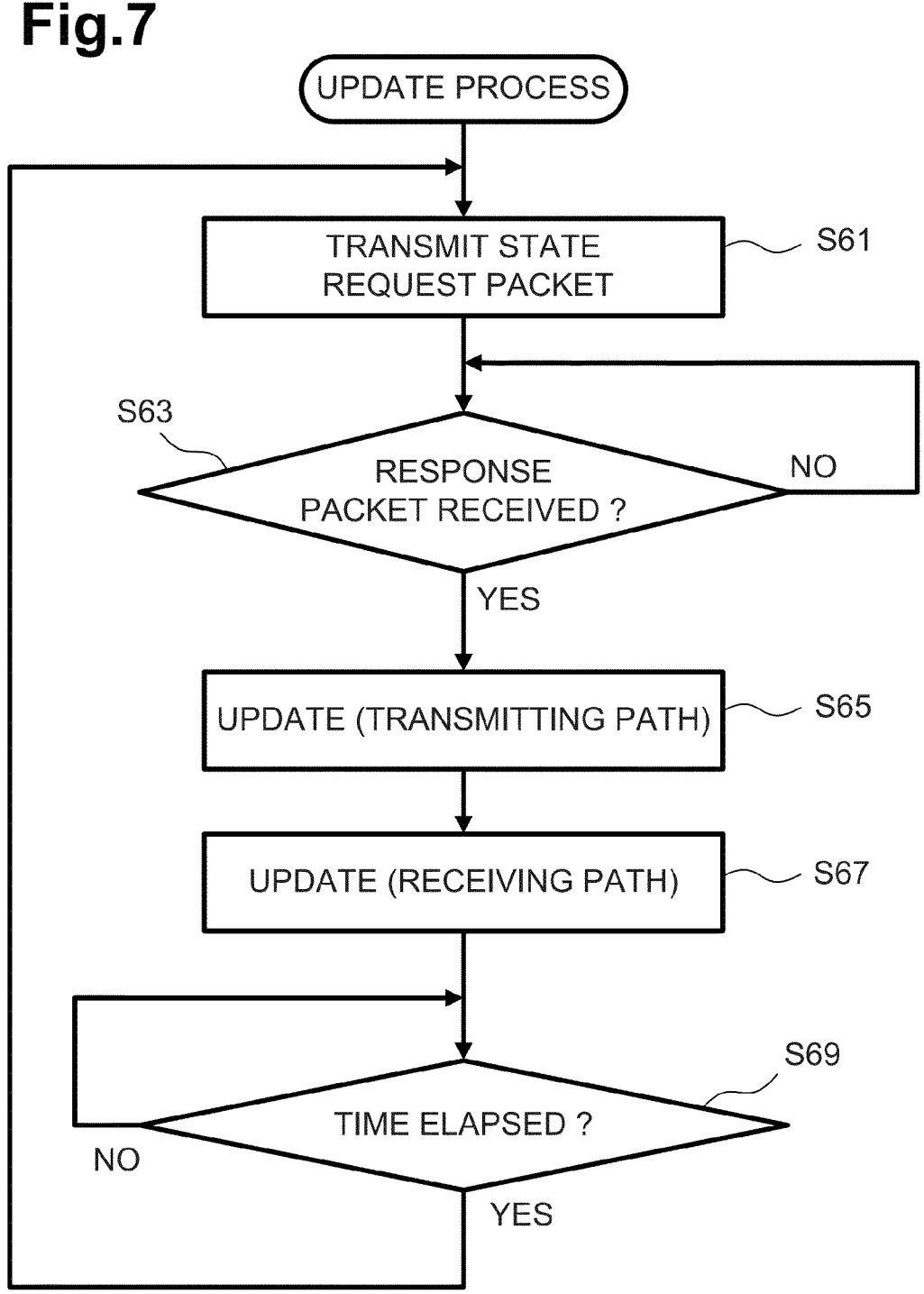
FIG. 7 is a flowchart showing an update process according to an exemplary embodiment.

Referring to FIG. 7, the update process will be described. The update process updates the management table 241 (see FIG. 4). A state request packet, which requests a counterpart apparatus to establish a communication in the receiving direction, is transmitted to the counterpart apparatus whose ID is stored in the management table 241 (step S61). Whether or not a response packet, which is transmitted from the counterpart apparatus in response to the state request packet, has been received is determined (step S63). If a response packet has not been received (i.e., "NO" in step S63), the process returns to step S63. If a response packet has been received (i.e., "YES" in step S63), the flags ("connected", "during data communication", and "during measurement") for the receiving path in the management table 241 are updated in accordance with the content of the received response packet (step S65).

The communication state of communication with the counterpart apparatus in the transmitting direction is acquired. The flags (i.e., "connected", "during data communication", and "during measurement") for the transmitting path in the management table 241 are updated in accordance with the acquired communication state (step S67). Whether or not a predetermined time has elapsed after updating the management table 241 is determined (step S69). If the predetermined time has not elapsed (i.e., "NO" in step S69), the process returns to step S69. If the predetermined time has elapsed (i.e., "YES" in step S69), the process returns to step S61. Thus, the management table 241 is updated at predetermined cycles.

Figure 8:
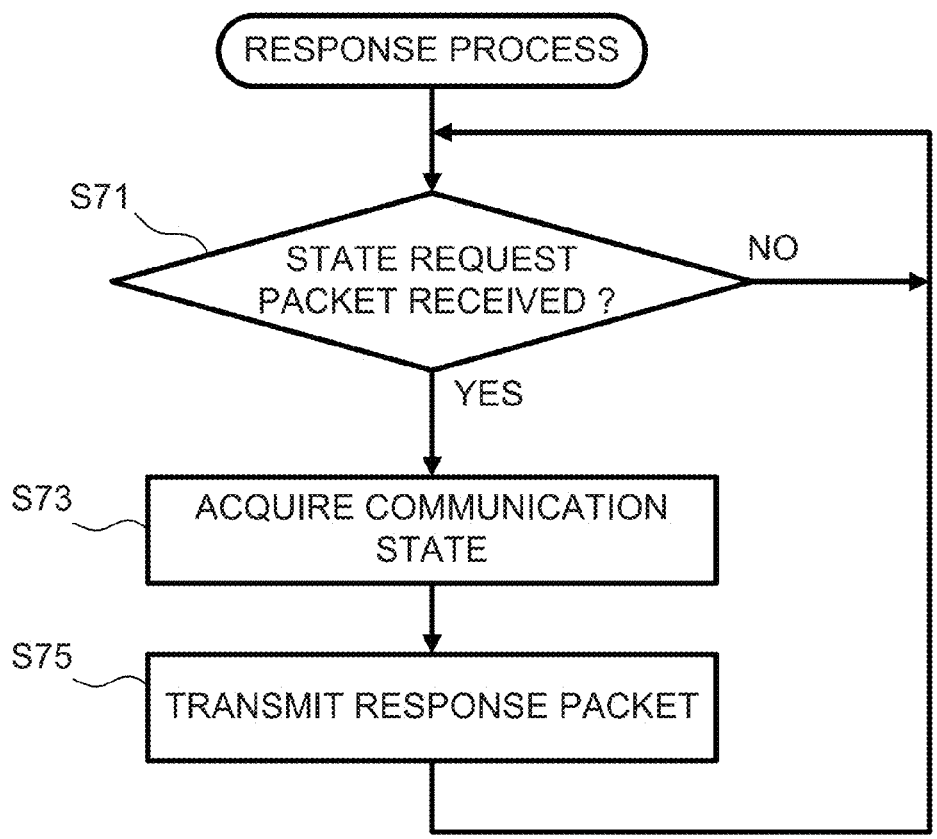
FIG. 8 is a flowchart showing a response process according to an exemplary embodiment.

Referring to FIG. 8, a response process will be described. Whether or not a state request packet has been received from a counterpart apparatus is determined (step S71). If a state request packet has not been received (i.e., "NO" in step S71), the process returns to step S71. If a state request packet has been received (i.e., "YES" in step S71), the communication state (i.e., "connected", "during data communication", and "during measurement") of the transmitting path to the counterpart apparatus that has transmitted the state request packet is acquired (step S73). The acquired communication state is stored in the response packet. The response packet, in which the communication state is stored, is transmitted to the communication apparatus that has transmitted the state request packet (step S75). The process returns to step S71.

Figure 9:
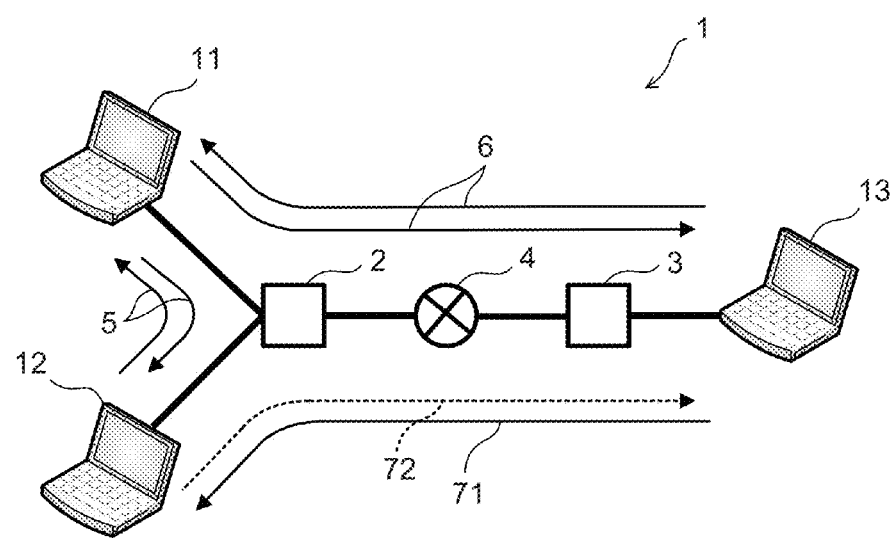
FIG. 9 is a schematic diagram showing how data communication is performed in a communication system according to an exemplary embodiment.

For example, it is assumed that, as illustrated in FIG. 9, bandwidth measurement is performed simultaneously with data communication on the communication paths between the communication apparatus 11 and the communication apparatus 12 (transmitting path/receiving path), the communication paths between the communication apparatus 11 and the communication apparatus 13 (transmitting path/receiving path), and the communication path from the communication apparatus 13 to the communication apparatus 12 (as indicated by arrows 5, arrows 6, and an arrow 71 in this order). It is assumed that only data communication is performed on the communication path from the communication apparatus 12 to the communication apparatus 13 (as indicated by an arrow 72). In the above-described process, the transmission condition of a communication packet transmitted from the communication apparatus 12 during the data communication (indicated by the arrow 72) is changed. Thus, the amount of free space in the receiving buffer 31 (see FIG. 2) of the relay apparatus 2 is always stable, so that accuracy of bandwidth measurement that is performed during the data communications indicated by the arrows 5, 6, and 71 is improved.

In this way, the communication apparatuses 11 to 13 can reduce a communication load to the relay apparatuses 2 and 3 by adjusting the transmission condition of a communication packet. Therefore, communication using communication packets is prevented from impeding the bandwidth measurement. As a result, the communication apparatuses 11 to 13 can accurately measure an available bandwidth.

Figure 10:
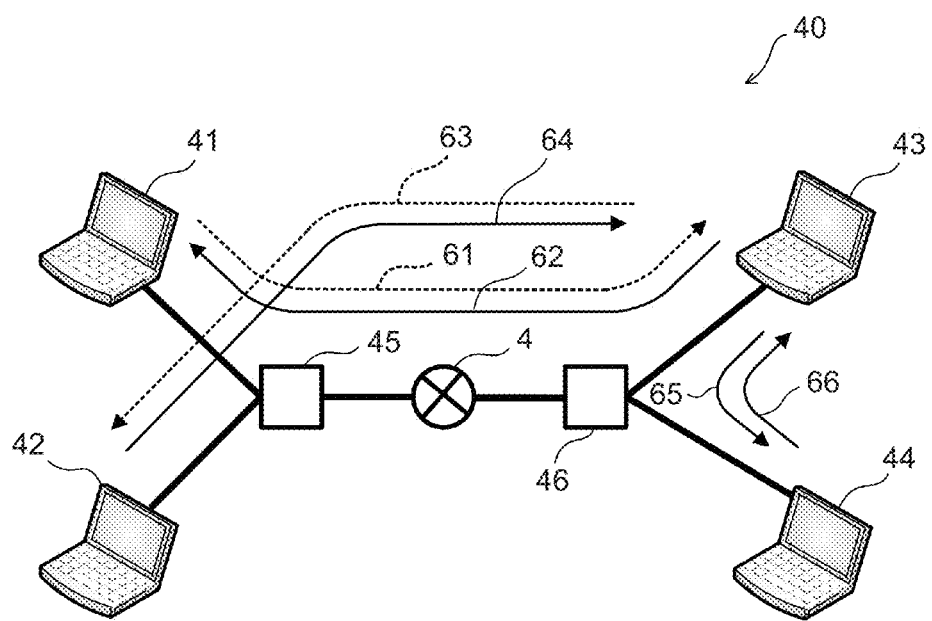
FIG. 10 is a schematic diagram showing how data communication is performed in a communication system according to another exemplary embodiment.

For example, FIG. 10 illustrates an exemplary embodiment in which it is assumed that a communication system 40 includes communication apparatuses 41 to 44 that are connected to the network 4. The communication apparatuses 41 and 42 are connected to the network 4 via a relay apparatus 45. Communication apparatuses 43 and 44 are connected to the network 4 via a relay apparatus 46. The communication apparatus 43 can be, for example, a multi-point control unit (MCU), and other communication apparatuses 41, 42, and 44 can perform communication with each other only via the communication apparatus 43. A bandwidth measurement is not performed simultaneously with data communication on the communication path from the communication apparatus 41 to the communication apparatus 43 (indicated by an arrow 61) and data communication on the communication path from the communication apparatus 43 to the communication apparatus 42 (indicated by an arrow 63), so that the transmission condition of a communication packet is changed. Thus, a heavy communication load is not applied to the relay apparatus 46, which is directly connected to the communication apparatus 43, and to the relay apparatus 45, which is connected to the communication apparatuses 41 and 42. Accordingly, the amount of used space in the receiving buffer 31 (see FIG. 2) can be stabilized. Thus, accuracy of bandwidth measurements that are performed simultaneously with data communications on the communication paths from the communication apparatus 43 to the communication apparatus 41 (indicated by an arrow 62), from the communication apparatus 42 to the communication apparatus 43 (indicated by an arrow 64), from the communication apparatus 43 to the communication apparatus 44 (indicated by an arrow 65), and from the communication apparatus 44 to the communication apparatus 43 (indicated by an arrow 66) can be increased.

In general, in a communication system including an MCU, a large number of packets pass through the MCU, so that the communication load to a relay apparatus (e.g., relay apparatus 46 in FIG. 10) that is directly connected to the MCU easily increases. In the present exemplary embodiment, all communication apparatuses in the communication system can independently change the transmission condition of communication packets, so that data communication can be performed while suppressing an increase in the communication load to the relay apparatus. Thus, accuracy of bandwidth measurement that is simultaneously performed with the data communication is maintained at a high level, so that the communication apparatus can select the optimum communication method in accordance with an acquired available bandwidth, and perform data communication with the MCU.

The present disclosure is not limited to the embodiment described above, and can be modified in various ways. In the embodiment described above, the transmission condition of a communication packet during data communication in the transmitting direction is changed. However, the present disclosure is not limited thereto. In an exemplary embodiment, the communication apparatus can allow a counterpart apparatus to change the transmission condition of a communication packet that is transmitted from the counterpart apparatus during data communication from the counterpart apparatus to the communication apparatus. The direction from the counterpart apparatus to the communication apparatus will be referred to as the "receiving direction." Hereinafter, an exemplary modification of the present exemplary embodiment will be described.

Referring again to FIG. 5, a main process according to the exemplary modification will now be described. Only the difference between the modification and the above-described embodiment will be described, and the description of the same parts is provided above. In step S25, whether or not data communication in the receiving direction is continuously performed is determined (step S25). If all flags corresponding to "during data communication" on "receiving path" are "0" in the management table 241, data communication in the receiving direction is not continuously performed (i.e., "NO" in step S25), and the process proceeds to step S35.

If "1" is stored as the flag corresponding to "during data communication—receiving path" in the management table 241, there is a counterpart apparatus that is continuously performing data communication in the receiving direction (i.e., "YES" in step S25). Next, whether or not bandwidth measurement is not performed simultaneously with data communication in the receiving direction and measurement communication is performed simultaneously with data communication on one or more other communication paths is determined (step S29). If "0" is stored as the flag corresponding to "during measurement—receiving path" and "1" is stored as the flag corresponding to "during measurement" on one or more other communication paths in the management table 241, bandwidth measurement in the receiving direction is not performed and measurement communication is performed simultaneously with data communication on one or more other communication paths (i.e., "NO" in step S29). In this case, a process (changing process, see FIG. 11) for changing the transmission condition of a communication packet that is transmitted from the counterpart apparatus during data communication in the receiving direction is performed (i.e., step S33).

Figure 11:
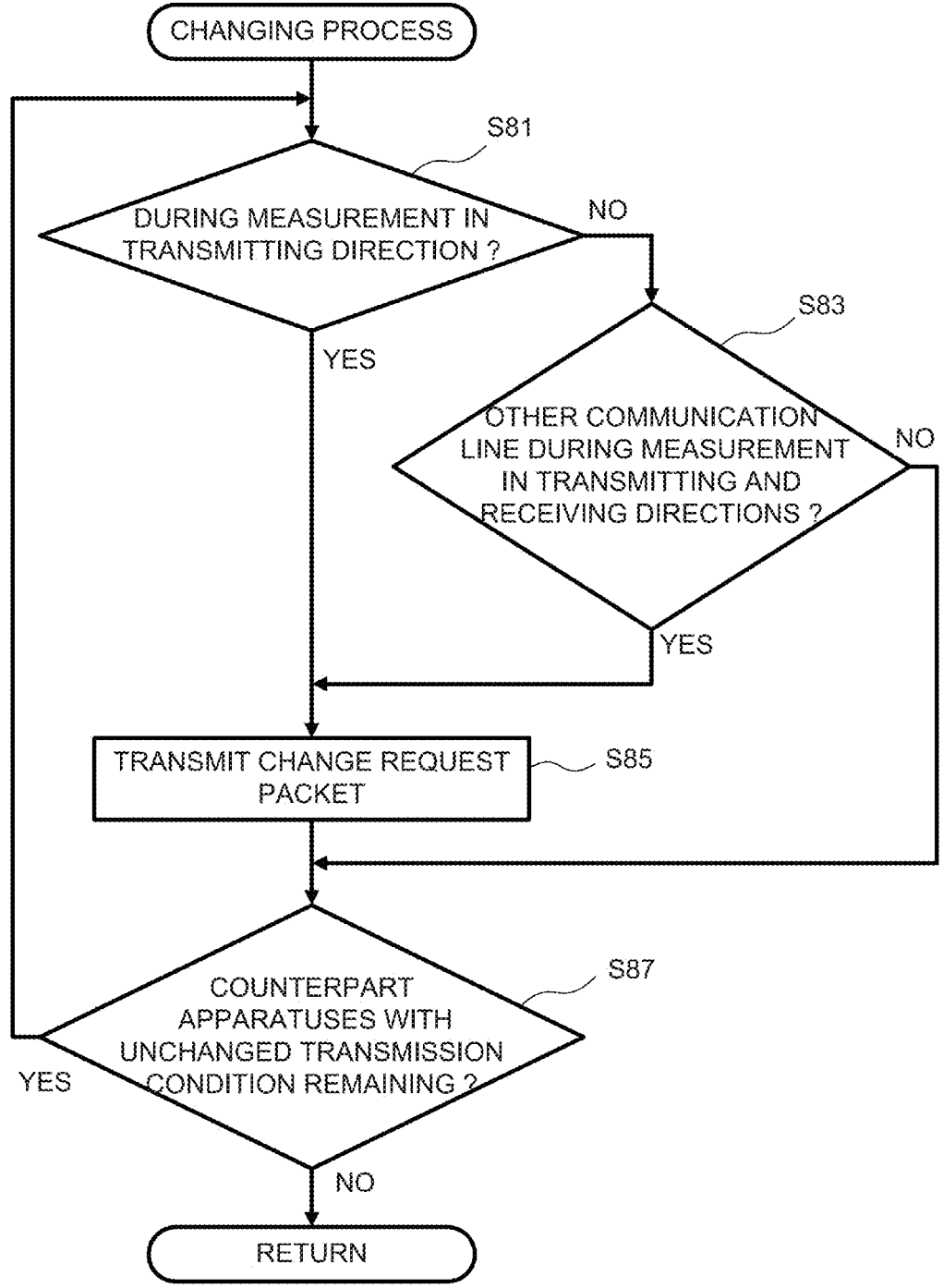
FIG. 11 is a flowchart showing a changing process according to another exemplary embodiment.

Referring to FIG. 11, an exemplary changing process according to the modification will now be described. First, one of counterpart apparatuses that are performing data communication in the receiving direction is selected. Whether or not data communication with the selected counterpart apparatus in the transmitting direction is performed, and bandwidth measurement is performed simultaneously with the data communication is determined by looking up the management table 241 (step S81). If bandwidth measurement is performed simultaneously with data communication in the transmitting direction (i.e., "YES" in S81), data communication in the receiving direction can affect the bandwidth measurement in the transmitting direction. This is because communication packets in the transmitting direction and the receiving direction are likely to pass through the same relay apparatus, and thereby the data communication in the receiving direction can apply a communication load to the relay apparatus through which bandwidth measurement is performed. Therefore, in order to change the transmission condition of a communication packet that is transmitted from the counterpart apparatus during data communication in the receiving direction, a change request packet is transmitted to the counterpart apparatus (step S85). The process proceeds to step S87.

On the other hand, if bandwidth measurement is not performed simultaneously with data communication in the transmitting direction (i.e., "NO" in step S81), whether or not bandwidth measurement is performed simultaneously with data communication with other counterpart apparatuses in the transmitting direction and in the receiving direction is determined (step S83). If bandwidth measurement is performed simultaneously with data communication with other counterpart apparatuses in the transmitting direction and in the receiving direction (i.e., "YES" in step S83), data communication in the receiving direction that is not performed simultaneously with bandwidth measurement may decrease accuracy of bandwidth measurement on the transmitting path and the receiving path. In this case, in order to change the transmission condition of a communication packet that is transmitted from the counterpart apparatus during data communication that is not performed simultaneously with bandwidth measurement, a change request packet is transmitted to the counterpart apparatus (step S85). The process proceeds to step S87. If bandwidth measurement is not performed simultaneously with data communication with any of other counterpart apparatuses (i.e., "NO" in step S83), the process proceeds to step S87.

Whether or not there is another counterpart apparatus for which change of the transmission condition has not been considered is determined (step S87). If there is a counterpart apparatus for which change of the transmission condition has not been considered (i.e., "YES" in step S87), the process returns to step S81. If change of the transmission condition has been considered for all counterpart apparatuses (i.e., "NO" in step S87), the changing process is finished, and the process returns to the main process (see FIG. 5).

Figure 12:
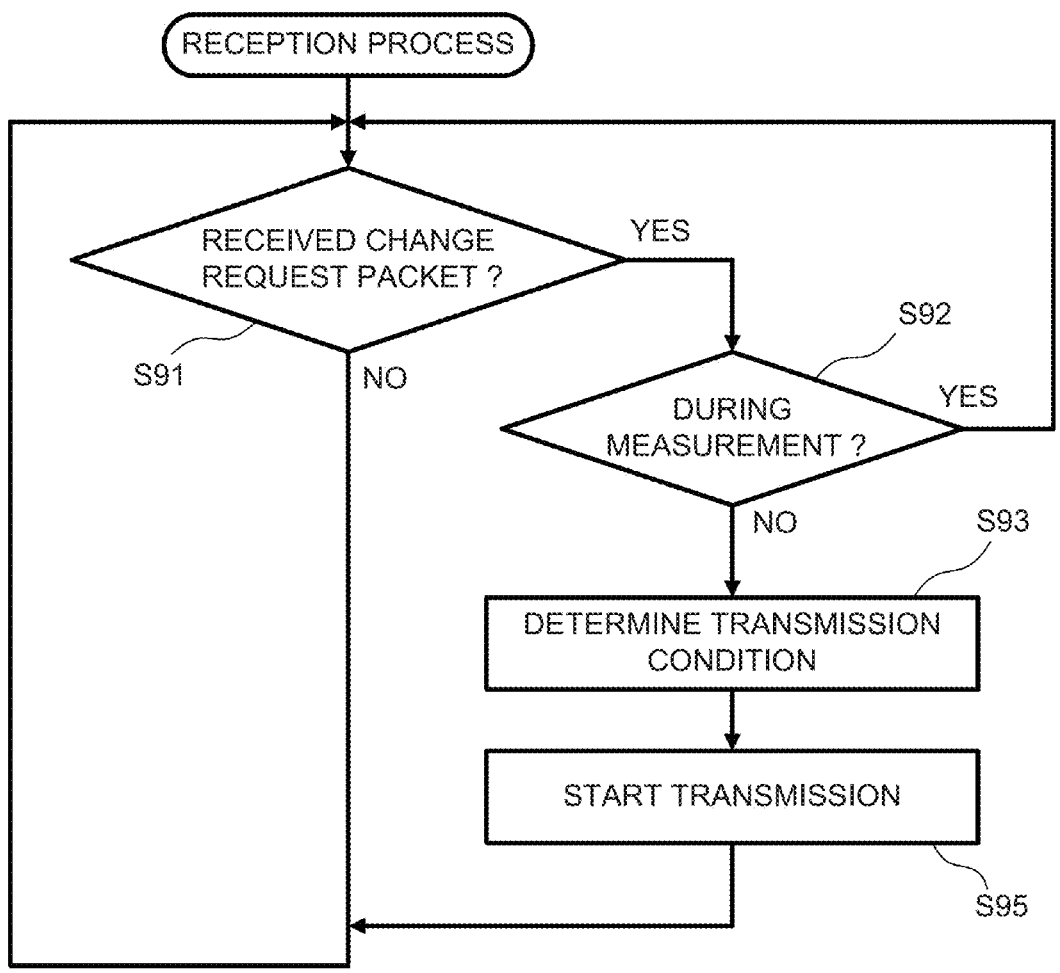
FIG. 12 is a flowchart showing a receiving process according to an exemplary embodiment.

Referring to FIG. 12, a receiving process will be described. Whether or not a change request packet has been received from another communication apparatus is determined (step S91). If a change request packet has not been received (i.e., "NO" in step S91), the process returns to step S91. If a change request packet has been received (i.e., "YES" in step S91), a determination is made as to whether or not a communication packet of data communication that is not performed simultaneously with bandwidth measurement is being transmitted to the communication apparatus that has transmitted the change request packet and measurement communication is performed simultaneously with data communication on one or more other communication paths. This can be determined by looking up the management table 241 (see FIG. 4) (step S92). Hereinafter, a communication apparatus that has transmitted a change request packet will be referred to as a "transmitting terminal". If data communication with the transmitting terminal is performed simultaneously with bandwidth measurement and measurement communication is not performed simultaneously with data communication on one or more communication paths (i.e., "YES" in step S92), the transmission condition of a communication packet cannot be changed, so that the process returns to step S91.

If a communication packet of data communication that is not performed simultaneously with bandwidth measurement is being transmitted to the transmitting terminal and measurement communication is performed simultaneously with data communication on one or more communication paths (i.e., "NO" in step S92), the transmission condition of a communication packet is determined to be one of (1) to (5) (step S93). A communication packet is transmitted to the transmitting terminal in accordance with the determined transmission condition (step S95). Thus, data communication is performed. The process returns to step S91. In this way, the communication apparatus can change the transmission condition of a communication packet when there is a request from the transmitting apparatus, so that the communication apparatus can efficiently change the transmission condition of a communication packet.

For example, it is assumed that the communication system 1 is configured as illustrated in FIG. 9. When data communication on the communication path from the communication apparatus 12 to the communication apparatus 13 (indicated by the arrow 72) is not performed simultaneously with bandwidth measurement (i.e., "NO" in step S29, see FIG. 5), data communication on the communication path from the communication apparatus 13 to the communication apparatus 12 (indicated by an arrow 71) is performed simultaneously with bandwidth measurement (i.e., "YES" in step S81), so that the communication apparatus 13 transmits a change request packet to the communication apparatus 12 (step S85, see FIG. 11). Even if data communication on the communication path from the communication apparatus 13 to the communication apparatus 12 (indicated by an arrow 71) is not performed simultaneously with bandwidth measurement (i.e., "NO" in step S81, see FIG. 11), because data communications (arrows 6) between the communication apparatus 13 and the communication apparatus 11 along the transmitting path and the receiving path are both performed simultaneously with bandwidth measurements (i.e., "YES" in step S83, see FIG. 11), the communication apparatus 13 transmits a change request packet to the communication apparatus 12 (step S85, see FIG. 11). Thus, a communication load on the relay apparatus 3 can be suppressed, whereby accuracy of bandwidth measurement that is performed simultaneously with data communications (arrows 6 and 71) is improved. In this way, the communication apparatus 13 can limit data communication that may affect the bandwidth measurement and change the transmission condition of a communication packet, thereby minimizing change in the transmission condition.

In the exemplary embodiment and exemplary modification described above, bandwidth measurement is performed by using a communication packet for data communication. However, the present disclosure is not limited thereto. For instance, bandwidth measurement may be performed independently of data communication. That is, a measurement packet for bandwidth measurement may be transmitted and received to measure the available bandwidth. When data communication is not performed simultaneously with bandwidth measurement, the communication apparatuses 11 to 13 may change the transmission condition of a communication packet that is used for the data communication.

The configuration of the communication system described above is an example, and other configurations (e.g., ring network, star network, bus network, mesh network, and the like) may be used. The relay apparatuses 2 and 3 may be, for example, a proxy server or a fire wall. The receiving buffers of the relay apparatuses 2 and 3 may store data in a way different from FIFO, for example, using a last-in first-out (LIFO) method.

What is claimed is:

1. A communication apparatus for performing data communication with at least one counterpart apparatus, each counterpart apparatus being another communication apparatus connected to a communication network via plural communication paths, the communication apparatus comprising:
    a communication unit configured to control transmission of a communication packet over at least one of the plural communication paths to another of the counterpart apparatuses in accordance with a transmission condition, said transmission condition being a predetermined transmission condition or a determined transmission condition changed from the predetermined transmission condition; and
    means for determining the determined transmission condition of a communication packet for the at least one of the plural communication paths not having a bandwidth thereof measured if bandwidth is measured on at least one of the other plural communication paths.

2. The communication apparatus according to claim 1, further comprising:
    means for transmitting the communication packet via the at least one of the plural communications paths not having a bandwidth thereof measured in accordance with a transmission condition that is determined by the determining means.

3. The communication apparatus according to claim 1, further comprising:
   means for identifying the at least one of the plural communications paths not having the bandwidth thereof measured.

4. The communication apparatus according to claim 1, wherein a transmission condition determined by the determination means comprises a determination that a size of the communication packet is different from a size that is specified in the predetermined transmission condition.

5. The communication apparatus according to claim 1, wherein a transmission condition determined by the determination means comprises a determination that a transmission cycle of the communication packet is different from a transmission cycle that is specified in the predetermined transmission condition.

6. The communication apparatus according to claim 1, wherein a transmission condition determined by the determination means comprises determining a size and a transmission cycle of the communication packet so that a transmission speed of the communication packet is constant.

7. The communication apparatus according to claim 1, further comprising:
   means for transmitting a request packet to a counterpart apparatus if communication data is received on one of the communication paths not having a bandwidth thereof measured while bandwidth is measured on the at least one other of the plural communication paths, the request packet requesting a change in the transmission condition of a data communication transmitted from the counterpart apparatus to the communication apparatus.

8. The communication apparatus according to claim 1, further comprising:
   means for receiving a request packet, the request packet requesting a change in the transmission condition,
   wherein, in response to receiving the request packet, the determining means determines the transmission condition of the communication packet if the communication path between the communication apparatus and the counterpart communication apparatus that has transmitted the request packet does not have the bandwidth thereof measured while bandwidth is measured on the at least one other of the plural communication paths.

9. A communication system comprising:
   a first communication apparatus; and
   a second communication apparatus, said first communication apparatus and said second communication apparatus connected to a communication network by plural communication paths,
   wherein the first communication apparatus and the second communication apparatus perform data communication with each other in accordance with a predetermined transmission condition,
   wherein the first communication apparatus includes:
      first means for identifying at least one of the plural communication paths on which a bandwidth measurement is not being performed, while the bandwidth measurement is performed on at least one other of the plural communication paths,
      means for receiving a request packet from the second communication apparatus, the request packet requesting a change in transmission condition from the predetermined condition to a determined condition for transmitting a communication packet for performing the data communication with the second communication apparatus,
      means for determining the determined transmission condition of the communication packet to be different from the predetermined transmission condition if the communication path between the first communication apparatus and the second communication apparatus that has transmitted the request packet that is received by the receiving means is the same as the communication path that is identified by the first identifying means, and
      first means for transmitting the communication packet to the second communication apparatus in accordance with the transmission condition that is determined by the determining means, and
   wherein the second communication apparatus includes:
      second means for identifying at least one of the plural communication paths on which a bandwidth measurement is not being performed, while the bandwidth measurement is performed on at least one other of the plural communication paths, and
      second means for transmitting the request packet to the first communication apparatus via the communication path that is identified by the second identifying means.

10. A non-transitory computer-readable medium storing a communication program that causes a communication apparatus to perform instructions of data communication with at least one counterpart apparatus, each counterpart apparatus being another communication apparatus connected to a communication network via plural communication paths, the program comprising instructions that cause a computer to perform the steps of:
   controlling transmission of a communication packet over at least one of the plural communication paths to another of the counterpart apparatuses in accordance with a transmission condition, said transmission condition being a predetermined transmission condition or a determined transmission condition changed from the predetermined transmission condition; and
   determining the determined transmission condition of a communication packet for transmission on at the least one of the plural communications paths not having a bandwidth thereof measured if bandwidth is measured on at least one of the other plural communication paths.

11. The non-transitory computer-readable medium of claim 10, wherein the program further comprises instructions that cause a computer to perform the step of:
   identifying the at least one of the plural communication paths not having the bandwidth thereof measured.

12. The non-transitory computer-readable medium of claim 10, wherein the program further comprises instructions that cause a computer to perform the step of:
   transmitting the data communication to the counterpart apparatus in accordance with the determined transmission condition.

13. A communication apparatus for performing data communication with at least one counterpart apparatus, each counterpart apparatus being another communication apparatus connected to a communication network via plural communication paths, the communication apparatus comprising:
   a processor; and
   memory storing computer-readable instructions, when executed by the processor, instruct the processor to perform processes comprising:
      controlling transmission of a communication packet over at least one of the plural communication paths to another of the counterpart apparatuses in accordance with a transmission condition, said transmission condition being a predetermined transmission condition or a determined transmission condition changed from the predetermined transmission condition; and determining the determined transmission condition of a communication packet for the at least one of the plural communication paths not having a bandwidth thereof measured if bandwidth is measured on at least one of the other plural communication paths.

14. The communication apparatus according to claim 13, wherein the computer-readable instructions, when executed by the processor, further instruct the processor to perform a process comprising:

transmitting the communication packet via the at least one of the plural communications paths not having a bandwidth thereof measured in accordance with a transmission condition that is determined by the determining means.

15. The communication apparatus according to claim 13, wherein the computer-readable instructions, when executed by the processor, further instruct the processor to perform a process comprising:

identifying the at least one of the plural communications paths not having the bandwidth thereof measured.

16. The communication apparatus according to claim 13, wherein the determined transmission condition comprises a determination that a size of the communication packet is different from a size that is specified in the predetermined transmission condition.

17. The communication apparatus according to claim 13, wherein the determined transmission condition comprises a determination that a transmission cycle of the communication packet is different from a transmission cycle that is specified in the predetermined transmission condition.

18. The communication apparatus according to claim 13, wherein the determined transmission condition comprises determining a size and a transmission cycle of the communication packet so that a transmission speed of the communication packet is constant.

19. The communication apparatus according to claim 13, wherein the computer-readable instructions, when executed by the processor, further instruct the processor to perform a process comprising:

transmitting a request packet to a counterpart apparatus if communication data is received on one of the communication paths not having a bandwidth thereof measured while bandwidth is measured on the at least one other of the plural communication paths, the request packet requesting a change in the transmission condition of a data communication transmitted from the counterpart apparatus to the communication apparatus.

20. The communication apparatus according to claim 13, the computer-readable instructions, when executed by the processor, further instruct the processor to perform a process comprising:

receive a request packet, the request packet requesting a change in the transmission condition, wherein, in response to receiving the request packet, the determining means determines the transmission condition of the communication packet if the communication path between the communication apparatus and the counterpart communication apparatus that has transmitted the request packet does not have the bandwidth thereof measured while bandwidth is measured on the at least one other of the plural communication paths.

* * * * *